US005807452A

United States Patent [19]

Schwinn

[11] Patent Number: 5,807,452

[45] Date of Patent: Sep. 15, 1998

[54] METHOD FOR WRAP-AROUND LABELING OF CONTAINERS

[75] Inventor: Georg Schwinn, Gronau, Germany

[73] Assignee: M & W Verpackungen Mildenberger & Willing GmbH, Gronau, Germany

[21] Appl. No.: 824,903

[22] Filed: Mar. 26, 1997

[30] Foreign Application Priority Data

Mar. 27, 1996 [DE] Germany ........................ 196 12 027.6

[51] Int. Cl.$^{6}$ .............................. B32B 3/04; B32B 31/16

[52] U.S. Cl. ............................ 156/86; 156/160; 156/205; 156/215; 156/229; 156/446

[58] Field of Search .................................... 156/446, 448, 156/456, DIG. 26, DIG. 13, 160, 229, 210, 214, 215, 187, 86; 264/342 RE, 291

[56] References Cited

U.S. PATENT DOCUMENTS 2,790,285 4/1957 Pike et al. ................................ 156/86
4,216,044 8/1980 Herdzina et al. ....................... 156/215
5,512,120 4/1996 Hinton et al. ........................... 156/448

*Primary Examiner*—Michael W. Ball
*Assistant Examiner*—Michael A. Tolin
*Attorney, Agent, or Firm*—Cushman Darby & Cushman, IP Group Of Pillsbury Madison & Sutro LLP

[57] ABSTRACT

The invention relates to a method for attaching wrap-around labels to cylindrical or prismatic containers starting with cutting of a section of a label from a suitable foil material. Then, the label section is shaped or deformed, maximally to the limit of what is reversible for the material being used, at a time immediately prior to the application of the label section onto the exterior of the container. The undulated label section is placed around the exterior of the container so that the edges of the label are overlapping and an adhesion or gluing process is initiated, for example, by reaction and/or heating. Reforming of the shaped or deformed label section is retarded until the label section rests against the exterior of the container along with the permitting the simultaneous progress of the adhesive process to be completed. By proper selection of material and with sufficient deforming of the label section, reforming of the deformed label section is also completed simultaneously with or shortly after the adhesive process is completed.

6 Claims, 2 Drawing Sheets

METHOD FOR WRAP-AROUND LABELING OF CONTAINERS

FIELD OF THE INVENTION

The invention relates to a method for attaching wrap-around labels to cylindrical or prismatic containers.

BACKGROUND OF THE INVENTION

Labels made of polyolefin foils are increasingly used for polyester bottles (PET bottles) on the market for both carbonated and non-carbonated beverages. In this case two methods are employed for labeling, namely the so-called stretch sleeve labeling and wrap-around labeling.

In connection with stretch sleeve labeling, a sleeve consisting of an elastic polyethylene material is formed. Prior to labeling, the sleeve section is stretched and inverted over the exterior of the bottle and moved into the desired position. Because of its restoring force it clings to the exterior of the container.

In wrap-around labeling, a label section corresponding to a printed pattern section is cut to size. This label section is then folded around the container and glued in place by means of a hot-melt adhesive at the overlapping section of the label edges, wherein preferably the outside is glued to the inside. Mainly foils made of oriented polypropylenes (OPP) are employed, but also some polypropylene foils. Wrap-around labeling is more common at this time than stretch sleeve labeling.

With wrap-around labeling, it is necessary to apply the labels under a defined interior tension, which is also maintained after labeling. Otherwise the bottles with wrap-around labels would lose the label if the tension were released. It was also noted in connection with large cycle rates of 600 to 700 cycles, and especially with short times available for setting of the adhesive connected therewith, that the adhesives would not set sufficiently and instead would come loose where the foil was glued under tension. It is, therefore, necessary to slow down the process to use longer cycle rates.

SUMMARY OF THE INVENTION

It is, therefore, an object of the present invention to recite a method for wrap-around labeling, in particular of PET bottles, wherein the above disadvantages do not occur and wherein in particular it is possible to achieve shorter setting times of the adhesive in spite of unchanged cycle rates.

This object is attained with a method for wrap-around labeling of cylindrical or prismatic containers, in particular made of PET, with the following method steps:

- a section of a label is cut to a size corresponding to a printed pattern from a printed reversibly stretchable plastic foil web with an adhesive coating, the latter a hot-melt adhesive in particular, which is distributed continuously or in accordance with the printed pattern;
- undulating shaping or crimping the label section maximally to the limit of reversibility at a time immediately prior to the application of the label section on the exterior of the container;
- placing the undulated or shaped label section around the exterior of the container with the edges of the label overlapping and initiating the gluing process by reaction and or heating;
- permitting retarded backforming or a slowed recovery of the undulated or shaped label material until the label section rests smoothly against the exterior of the container along with permitting the simultaneous setting of the adhesive process to run to its end;
- wherein the recovery of the undulated or shaped label terminates simultaneously with or a short time after the end of the adhesive process.

The term "cutting to size of a section of a label corresponding to a printed pattern" should also be understood to mean that the labels are appropriately stamped out of a foil.

Therefore, the setting time required for the hot-melt or other adhesive is achieved with the above method in that only a slight tension acts on the adhering place between the label section edges because of the retarded or slowed back-formation or reforming of the undulation shapes, which is less than the force required for tearing the adhesive connection apart. On the other hand, the material can be adjusted in such a way that residual elasticity remains in the label which sufficiently tensions the label on the exterior of the labeled container and can also compensate for even slight shrinkage of the container because of the reduction of the interior pressure.

Even though no increased setting times of the hot-melt adhesive glue are required, a secure connection of the adhesion in the area of the edges of the label section is developed.

Foils which are suitable for a method of the above mentioned type are known to one skilled in the art. Examples of label sections that are particularly suitable are comprised of a thermoplastic styrene-butadiene sequential polymer, which exhibits a retarded back-formation or sufficiently slow recovery time for the shapes induced in the label, wherein sufficient residual tension remains. Label sections can also be made of a foil material of polyolefins which are obtained by means of catalytic polymerization methods with the aid of metallocene catalysts.

Wave-embossing machines, known per se, or devices which generate an "undulation" or a "shaped" condition by stretching in various configurations, for example also as a chevron undulation or by stretching in defined closed areas, are suitable undulations.

Hot-melt adhesives are understood to be melt adhesives, in particular saturated polyesters, ethylene-vinyl acetate copolymers and polyamide resins. Regarding their application and characteristics, reference is made to the book by Gerd HABENICHT, "KLEBEN, Grundlagen, Technologie, Anwendung" [ADHESIVES, Basic, Technologies, Application], 2nd ed., Springer-Verlag, Berlin 1990, pp. 139 to 147.

Corresponding to the requirements, an undulation at a length change from 110 to 150% of the original length is intended, wherein preferably the length of time of the retarded back-formation to the original length should lie between 90 msec and 1 sec.

Examples of the present invention will be described below.

Other objects, features, and characteristics of the invention will become apparent upon consideration of the following description and the appended claims with reference to the accompanying drawings, all of which form a part of this specification and wherein like reference numerals represent corresponding parts in the various views.

DETAILED DESCRIPTION OF THE PREFERRED EMBODIMENT

Figure 3:
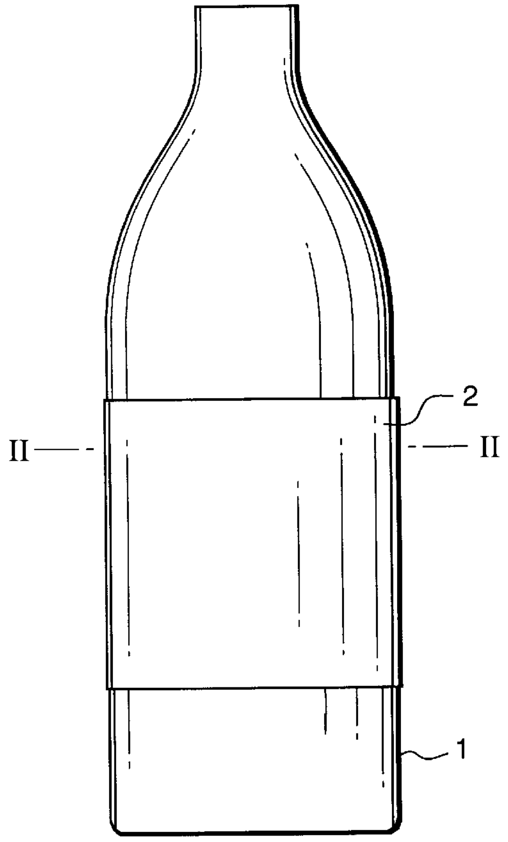
FIG. 3 is a side elevational view of a bottle with a label thereon.
Figure 4:
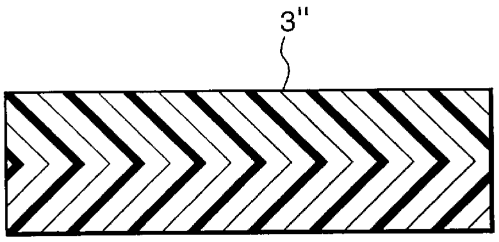
FIG. 4 is a top plan view of a shaped label exhibiting a chevron-shaped undulation.

As referenced above, the present invention concerns the easing of tensions in labels being attached to containers, such as, for example, the PET bottle shown in FIG. 3.

Figure 1:
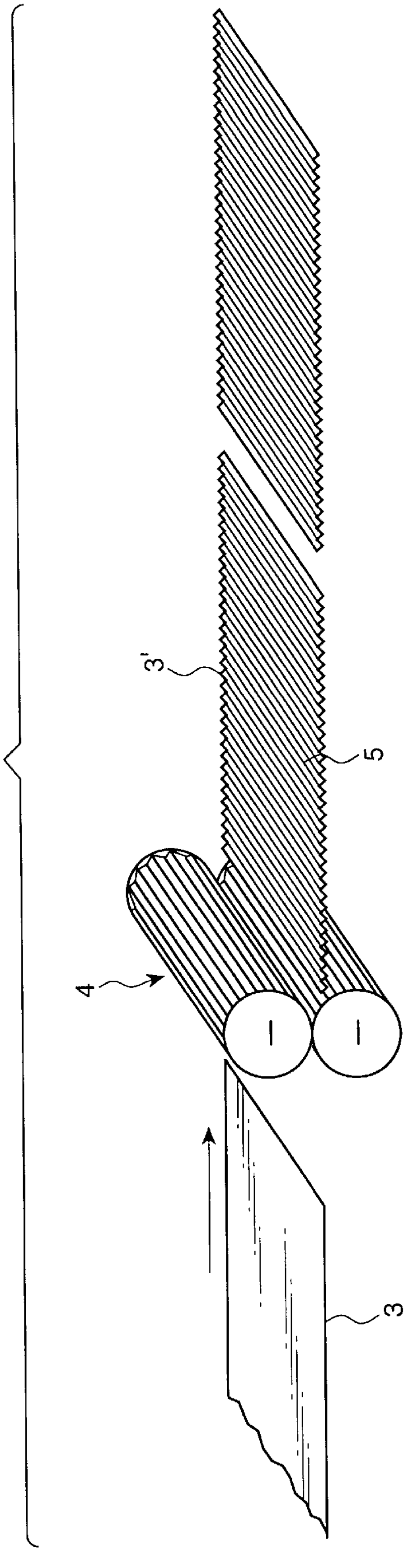
FIG. 1 is a diagrammatic perspective view of cut labels being shaped or crimped.

Exempting apparatus is shown in FIG. 1 where a label 3, having been cut from a supply, is fed through a pair of opposing rollers each having a surface that is molded or machined with indentations that will merge together to crimp or shape the label material as it moves therebetween. The label material is crimped to form undulations that in this particular instance extend across the label from edge to edge. Alternatively, as shown, for example in FIG. 9, the crimping or undulations in label 3" can take the form of chevrons.

Figure 2A:
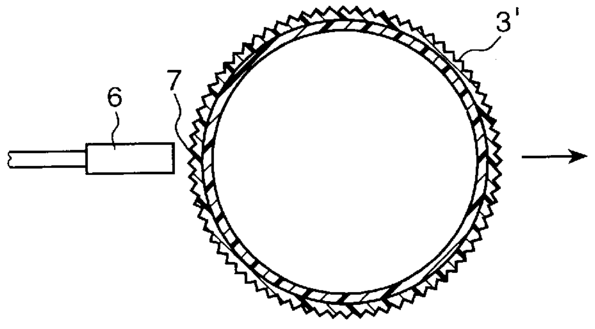
FIG. 2*a* is a cross-sectional view of a crimped label fastened onto a bottle taken along lines II—II in FIG. 3.

The crimping preferably occurs at room temperature so that the crimping is not permanent but rather will reform or recover to again yield a smooth label material. Such a transition can be observed by comparing FIG. 2*a*, where the crimped label 3' is being secured in place, and FIG. 2*b*, where the label has recovered and is once again smooth.

With continuing reference to the Figures, the following examples provide further discussion concerning the invention.

EXAMPLE 1

To provide cylindrical PET soft drink bottles 1 of a diameter of, for example, about 80 mm with labels, one of which is shown at 2 in FIG. 3, label sections 3, as in FIG. 1, of 255 mm length are cut off, a large roll of material (not shown), for example corresponding to a printed pattern from a printed plastic foil web. The plastic foil web 3 may be comprised of a triple, co-extruded foil layer. This is comprised of a semi-elastic foil layer on the basis of an acrylic acid copolymer of 100 μm thickness located in the center of a laminated structure, which is covered on both sides, respectively, with an outer layer of polypropylene of a thickness of about 20 μm, which gives transparency and stiffness to the foil as a whole.

The elastic inner or central layer can also be a styrene-butadiene sequential polymer.

The foil is partially provided with a 10 μm thick polyethylene layer as a hot melt in the area of the overlap seam.

The label sections 3 are moved at room temperature through a pair of gear type rollers or toothed wheels 4 which, in the course of passing through such wheel 4 each label will be shaped, as by being deformed or crimped resulting in a series of undulations extending transversely to the longitudinal extension of the labels with a longitudinal change of 125% of the original length, i.e. an longitudinal change of 25%.

Figure 2B:
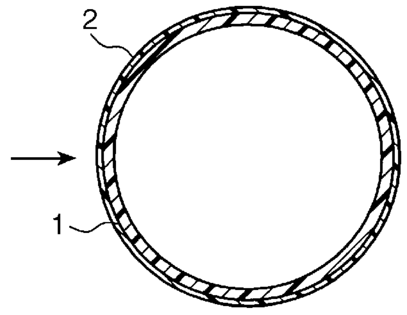
FIG. 2*b* is a cross-sectional view of a label where the crimped shape has returned to a smooth, uncrimped state.

Then the shaped or crimped layer sections 3' are placed around the exterior of the bottle 4 within the filling cycle of 0.1 sec, wherein at first the label sections 7 are still strongly undulated. The hot-melt layers at the overlapping end sections of the labels are caused to melt at a temperature of 120° C. by means of a die 6. The retarded back-forming or recovery of the undulation continues, while only very weak tension acts on the adhesive connection area; however, the tension is sufficient to maintain the label on the exterior of the bottle. The process of setting and cooling of the adhesive requires less time than the retarded recovery of the undulation that is the change or transition in the label material reforming from the crimped state, as in FIG. 2*a*, to a smooth label (0.2 as compared to 1.0 sec), as shown in FIG. 2*b*. The PET bottles 1 are held in a transport standby station during this time. The size of the label and the adhesive area are such that a residual tension remains in the label.

EXAMPLE 2

In order to provide small cylindrical medicament bottles made of PE of a circumference of 200 mm with labels, label sections of 210 mm length are cut off, corresponding to a printed pattern, from a printed plastic foil web. The plastic foil web comprised of a single-layer, flat-extruded foil of semi-elastic polypropylene having a 20 μm thickness which was obtained in a polymerization process wherein metallocenes were employed as catalysts.

The label sections are moved at room temperature through a pair of gear rollers; in the course of passing through them they are given an undulation or shape extending transversely to the longitudinal extension of the labels with a longitudinal change of 150% of the original length, i.e. an longitudinal change of 50%.

Then the layer sections are placed around the exterior of the bottle within a filling cycle of 0.25 sec, wherein at first the label sections are still strongly undulated. Adhesion is initiated at the overlapping edges of the label sections by the application of a polymethyl methacrylate adhesive and pressing the adhesive edges onto each other.

The retarded reforming of the undulation continues, while only very weak tension acts on the adhesive connection area; however, the tension is sufficient to maintain the label on the exterior of the bottle. The process of setting of the adhesion requires less time than the retarded backforming of the undulation (0.3 as compared to 0.75 sec). The containers are held in a transport standby station during this time.

The size of the label and the adhesive area are such that a residual tension remains in the label. All in all it should be noted that the method permits the tension-free setting of the adhesive, while because of the retarded undulation sufficient tension is exerted on the label that it solidly rests against the container and, even with the bottle emptied, does not fall off in spite of the reduced bottle diameter because of the residual shrinking force.

What is claimed is:

1. A method for attaching wrap-around labels to cylindrical or prismatic containers with the following method steps:

- cutting a section of a label corresponding to a printed pattern from a printed reversibly stretchable plastic foil web with an adhesive coating, which is distributed continuously or in accordance with the printed pattern,
- deforming the label section maximally to the limit of reversibility at a time immediately prior to the application of the label section on the exterior of the container;
- wrapping the deformed label section around the exterior of the container with the edges of the label overlapping and then initiating an adhesion process to bond the overlapped edges,
- permitting retarded reforming of the deformed label section until the label section rests against the exterior of the container and simultaneously completing the adhesion process, wherein the retarded reforming of the deformed label section terminates simultaneously with or a short time after completion of the adhesion process.

2. The method in accordance with claim 1, wherein the label section comprises thermoplastic styrene-butadiene sequential polymer.

3. The method in accordance with claim 1, wherein the label sections comprises a foil material with a high proportion of elastic polyolefins, produced by means of metallocene catalysts, in particular polyethylene or polypropylene.

4. The method in accordance with claim 1 or 2, wherein in the step of deforming creates a longitudinal change between 110 to 150% of the original length of the label section.

5. The method in accordance with claim 4, wherein the length of time for reforming of the label section to its original length lies between 90 msec and 1 sec.

6. The method in accordance with claim 4, wherein the adhesive layer comprises a hot-melt adhesive.

* * * * *